No. 865,291. PATENTED SEPT. 3, 1907.
W. J. BELL.
LIGHTNING ARRESTER.
APPLICATION FILED SEPT. 25, 1906.
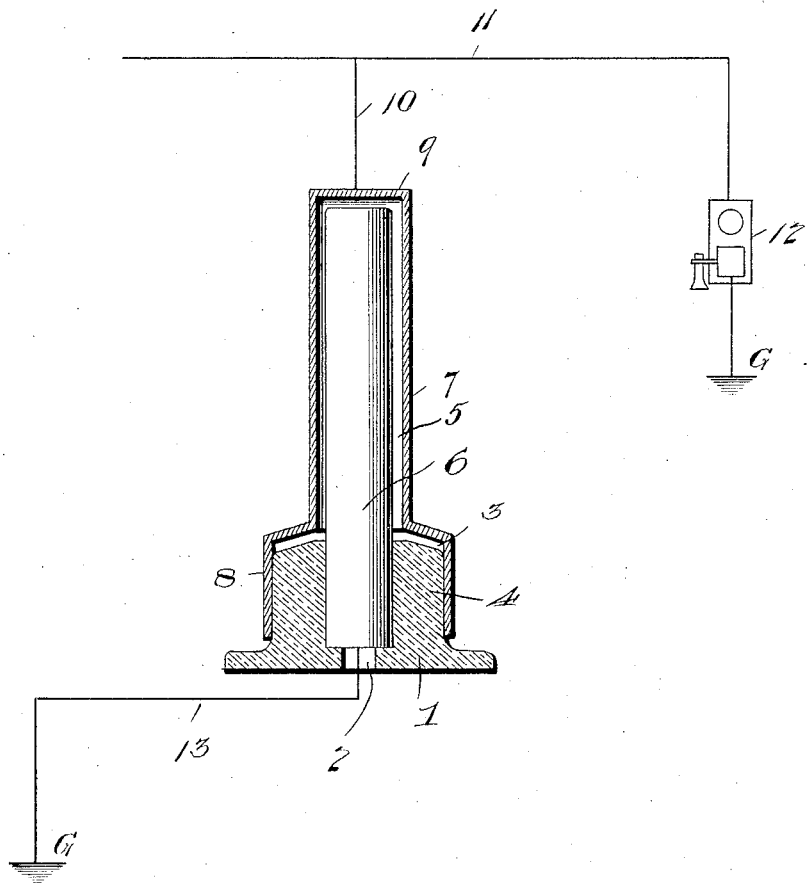

UNITED STATES PATENT OFFICE.

WILLIAM J. BELL, OF DEERFIELD, WISCONSIN, ASSIGNOR OF ONE-THIRD TO HOWELL B. FARGO, OF DEERFIELD, WISCONSIN.

LIGHTNING-ARRESTER.

No. 865,291.  Specification of Letters Patent.  Patented Sept. 3, 1907.

Application filed September 25, 1906. Serial No. 336,102.

*To all whom it may concern:*

Be it known that I, WILLIAM J. BELL, a citizen of the United States, residing at Deerfield, in the county of Dane and State of Wisconsin, have invented new and useful Improvements in Lightning-Arresters, of which the following is a specification.

This invention relates to lightning arresters adapted for use with electrical apparatus generally, but particularly useful in connection with telephone and telegraph circuits.

The improved arrester has an insulating material interposed between the line and the ground, whereby the high-potential current from a conductive covering or cap to a carbon pencil or element held within the arrester and connected to ground, the cap and carbon element being supported by a non-conducting base.

The accompanying drawing illustrates the invention in its preferred form and referring thereto, the numeral 1 designates a base formed of porcelain or other suitable non-conducting material and having a central opening 2 therein and an upwardly projecting cup or socket 3 surrounded by a rim or flange 4 which is of less height than the socket 3. Within the socket 3 a carbon element 6 is fitted and projects considerable distance above the said socket, this element being preferably in the form of a pencil or cylindrical piece of carbon. Over the carbon element and the base a metallic cap or covering 7 is applied, the said cap or covering having its inner surface out of contact at all points with respect to the carbon element 6. In other words a space 5 is formed between the cap or cover 7, the carbon element 6 and the top of the base. The lower extremity 8 of this cap is increased in diameter to frictionally fit over and bear against the outer surface of the rim or flange 4. The top 9 of this cap has a wire 10 connecting the same to the line wire 11 which runs to and is connected up with a telephone apparatus 12, or any other electrical organization with which it may be used. A wire 13 is connected to the lower end of the carbon element 6 and passes out through the opening 2 to ground G.

When the line wire 11 is subjected to any undue static or high-potential induced atmospheric charge which would be detrimental to the telephone or other electrical apparatus, such charge is permitted to pass from the line wire through the medium of the wire 10 to the cap 7 and from the latter through space 5 to the carbon element 6 and thence passes to ground by the wire 13 thus saving burning out any part of the apparatus to which the line wire 11 is connected or of which it forms a part of the circuit.

By arranging the carbon element 6 and the metallic cap 7 as set forth the undue static charge which may be produced by lightning coming in over the line has a greater chance to bridge across the space 5 between the cap 7 and the carbon element and will not form a permanent circuit by reason of the use of metal and carbon in the relation specified.

The improved arrester is exceptionally simple and comparatively inexpensive and may be quickly installed in operative positions.

What I claim is:

1. A lightning arrester of the class described involving a non-conductive base having an annular flange forming a socket, a carbon element extending a distance from said base and mounted in the said socket, and a metallic covering surrounding the carbon element of greater circumference than the latter to afford an air space between the said carbon element and the interior surface of the covering.

2. A lightning arrester including a non-conductive base having an annular flange forming a socket, a cylindrical carbon element removably mounted in the socket, a metallic covering correspondingly shaped to the carbon element and flange and supported by the latter, said covering being of increased interior diameter with respect to the circumference of the carbon element to form an air space between the said covering and carbon element throughout the free portion of the latter, a main line wire having connection with the covering, and a ground wire having connection with the carbon element.

In testimony whereof, I affix my signature in presence of two witnesses.

WILLIAM J. BELL.

Witnesses:
I. B. BENNETT,
E. J. HELMICKS.